INVENTORS
PHILIP V. H. WEEMS
BY ROBERT HENRICH
ATTORNEY

July 28, 1936.  P. V. H. WEEMS ET AL  2,049,096
DRIFT AND GROUND SPEED METER
Filed May 15, 1934  4 Sheets-Sheet 4

INVENTORS
PHILIP V. H. WEEMS
ROBERT HENRICH
BY
ATTORNEY

Patented July 28, 1936

2,049,096

UNITED STATES PATENT OFFICE 2,049,096

DRIFT AND GROUND SPEED METER

Philip V. H. Weems and Robert Henrich, San Diego, Calif.

Application May 15, 1934, Serial No. 725,816

5 Claims. (Cl. 33—46.5)

This invention relates to a meter for indicating the drift and ground speed of an aircraft and has among its various objects to provide an instrument for the purpose mentioned having a member movable at different speeds to synchronize it with the relative movement of an object on the ground, means to introduce the altitude argument into the indication of the instrument, and means actuatable by the air stream flowing past the craft to drive the aforesaid member.

A further object is to provide an instrument of the type mentioned that does not require the eye of the observer to be positioned at any particular point.

We are aware that heretofore ground speed meters have been devised that utilize the principle of a moving member synchronizable with the relative movement of an object on the ground but in all of these with which we are acquainted it is necessary that the eye of the observer be positioned at some particular point to obtain correct readings. With the present invention no such restriction upon the position of the eye is required since an image of the ground beneath the aircraft is projected to be visible in conjunction with, and substantially in the same plane as, the sighting point on the synchronized member.

Figure 1:
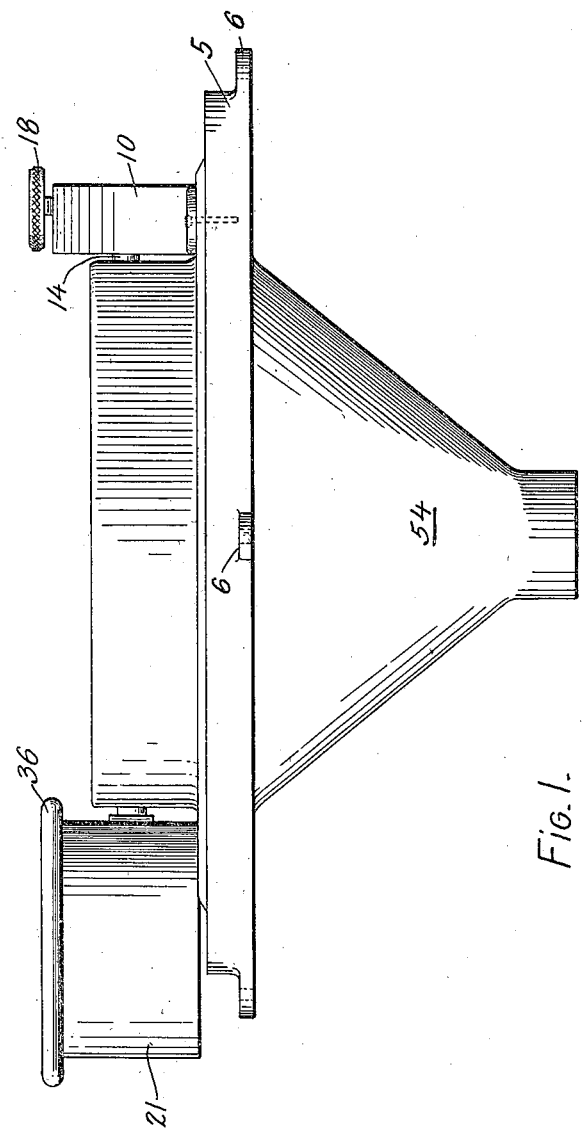
Fig. 1 is a side elevation of the present invention.
Figure 2:
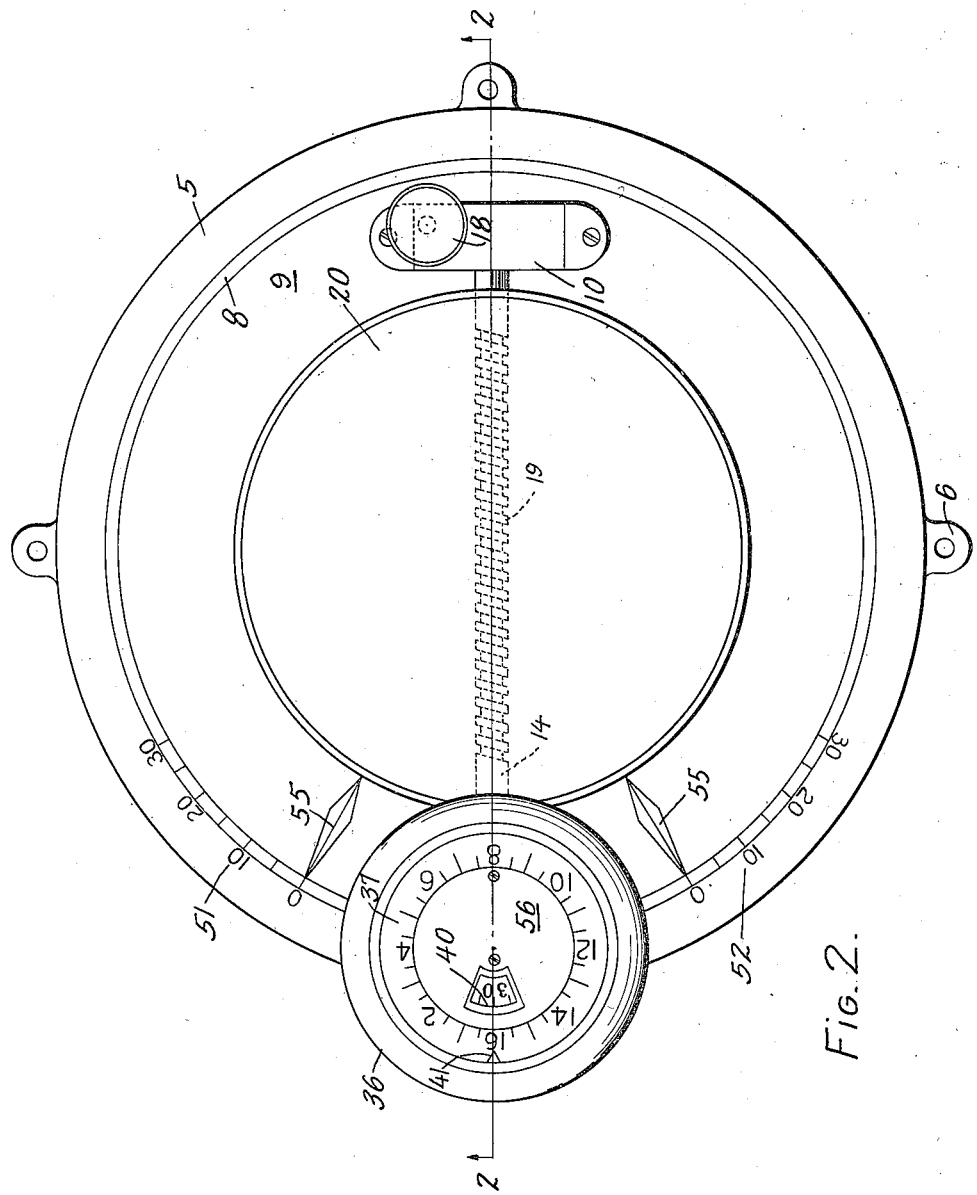
Fig. 2 is a top plan view thereof.
Figure 3:
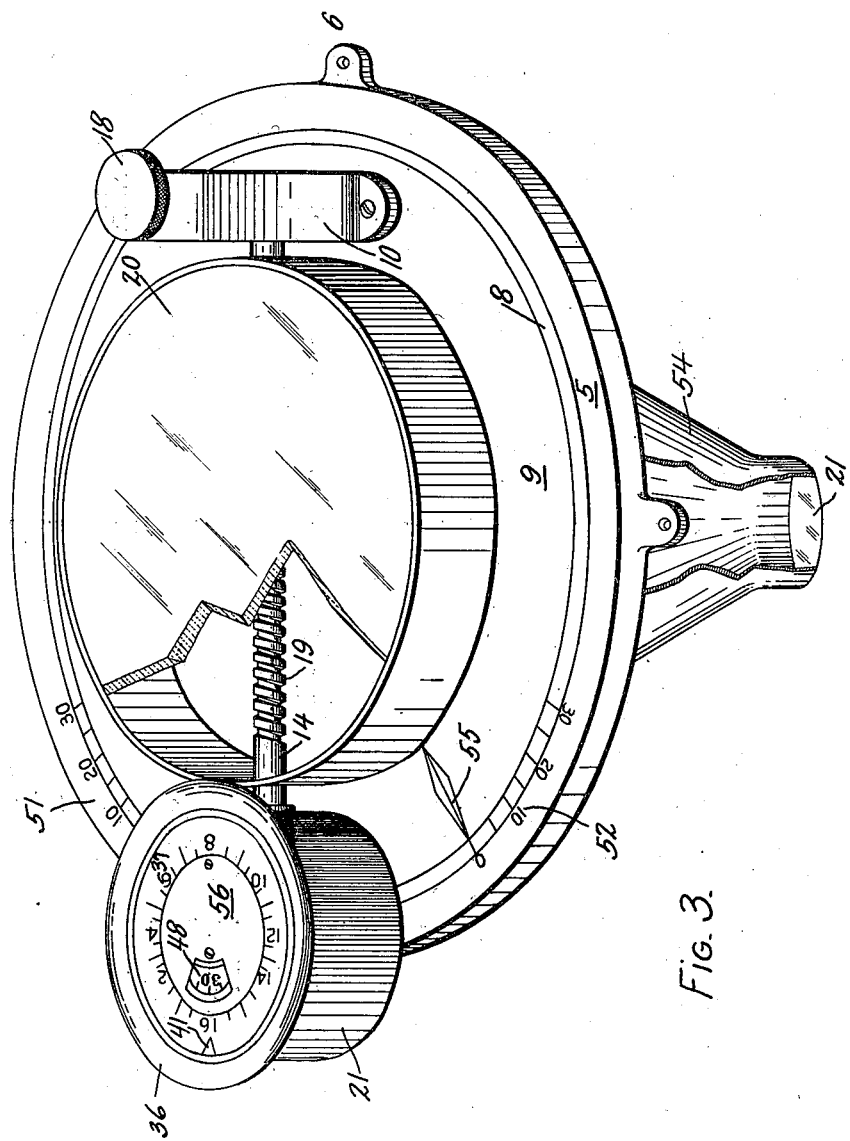
Fig. 3 is a perspective top view with the lens support moved relatively out of position so it will be shown in the drawings.
Figure 4:
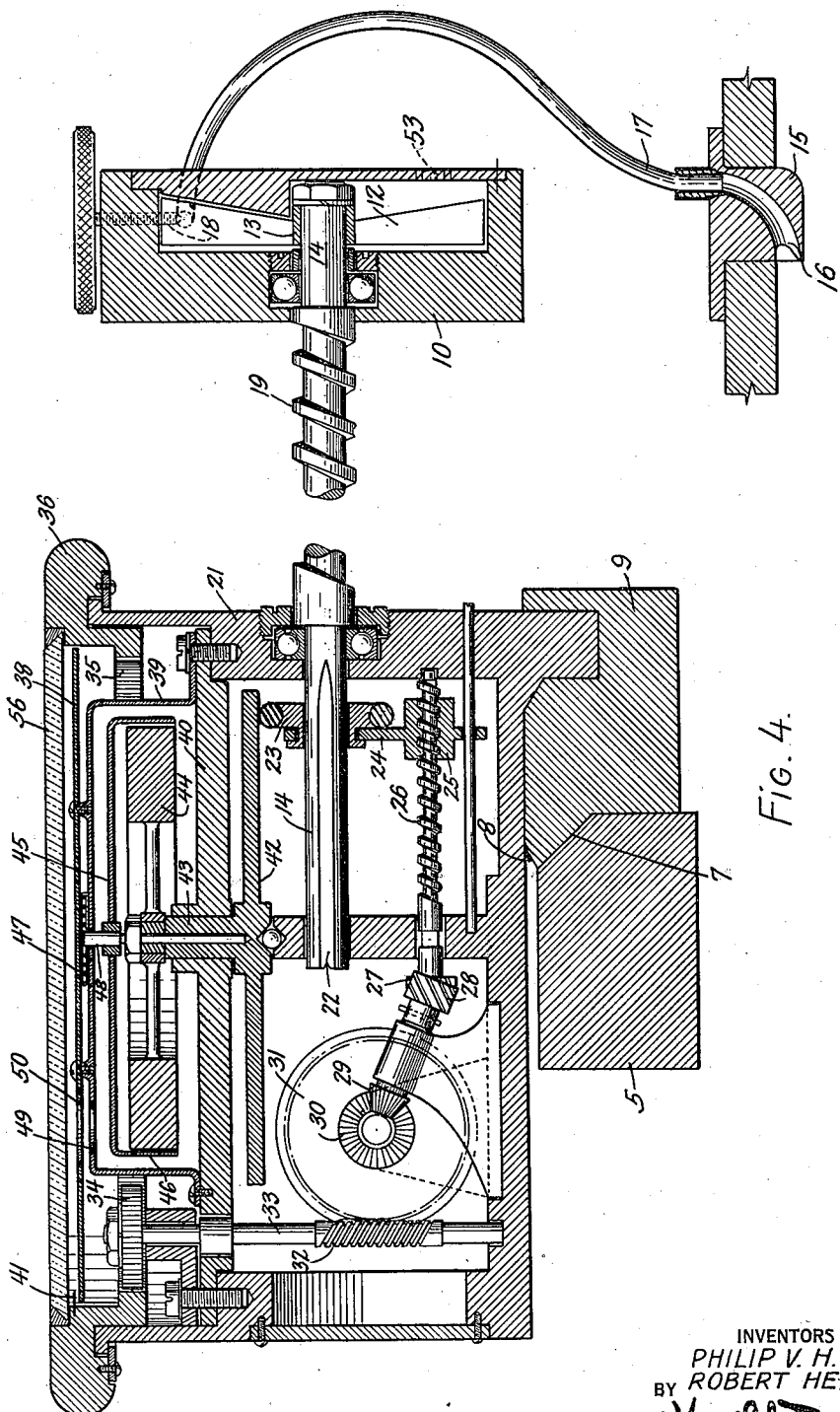
Fig. 4 is a sectional view of the indicating and sighting mechanism substantially on the line 4—4 of Fig. 2.

The supporting ring 5 is fixed to the aircraft structure by means of bolts or screws passed through the ears 6. As is shown in Fig. 4, the uppermost inner edge of the ring 5 is bevelled and upon the face 7 thus formed a face on flange 8 rides to support a ring 9 that carries the mechanism to provide for rotation thereof for measuring the drift angle, as will be hereinafter set forth. Mounted upon the ring 9 is a housing 10 within which is disposed an air-driven motor having radial blades 12 fixed to a hub 13 that has driving engagement with a shaft 14. An air intake member 15 that may be supported to rotate with ring 9 has formed in it a passage 16 having an enlarged mouth that merges into contracted passage that is connected by a tube 17 to the housing 10; the mouth of passage 16 being directed forwardly of the craft, a stream of air is forced through tube 17 and discharged against blades 12 which causes the blades to rotate and drive shaft 14, the exhaust air exiting through opening 53. The speed of rotation of shaft 14 is controlled by means of a screw 18 disposed to be movable to close the outlet of tube 17 whereby the quantity of air admitted to impinge upon blades 12 may be adjusted to drive the shaft 14 at such speed that the apparent or virtual movement of helical thread 19 along shaft 14 will synchronize with the movement of an object on the ground.

To avoid the necessity of observing the thread 19 from any fixed point or points a translucent screen 20, which may be of frosted glass, celluloid, or the like, is placed immediately above the thread 19 and by means of a suitable lens 21 supported by a barrel 54 an image of the ground beneath the craft is projected upon screen 20, thus bringing the image of the ground into substantially the same plane as is the observed point on thread 19 and hence the image and the thread may be viewed simultaneously with the eye of the observer in any convenient position. It is apparent that any given object in the image of the ground will appear to move across the screen 20 and also that the space between any two adjacent turns of thread 19 will likewise have an apparent movement across the screen, it being understood that shaft 14 is disposed parallel to the path of the craft and that the direction of rotation of the shaft is such as to cause the above mentioned apparent movement of a space between adjacent turns on thread 19 to follow the relative movement of an object upon the ground.

One end of shaft 14 is journalled in a casing 21 mounted upon ring 9 opposite the housing 10, the end of shaft 14 inside the casing 21 having in it a slot 22 for feathering upon the shaft a friction disk 23 that is connected by a yoke 24 to traveling nut 25 upon screw 26 whereby the friction disk 23 is moved longitudinally of shaft 14 when the screw 26 is rotated. Upon one end of screw 26 is fixed a gear 27 that is meshed with a gear 28 carried on one end of the shaft that has upon its upper end a bevelled pinion 29 that meshes with a pinion 30 mounted to rotate with a worm gear 31. Engaged with gear 31 is a worm 32 on a shaft 33 that carries at its upper end a pinion 34 meshed with internal gear 35 on ring 36 that is rotatably mounted on the upper end of casing 21. An altitude scale 37 is inscribed upon a plate 38 mounted on a supporting member 39 that is fixed to a plate 40 secured to casing 21, there being an index 41 carried by ring 36 to project over the altitude scale.

A disk 42 is rotatably mounted and disposed with one face in driving contact with the friction disk 23. A hub 43 extending upwardly from disk 42 has secured to it a magnet 44 to rotate therewith. A rotatably mounted disk 45 has a flange 46 that extends over the magnet 44 and upon rotation of the magnet currents will be induced in the metal of disk 45 and flange 46 that will tend to drag disk 45 around with the magnet but the rotation of disk 45 is opposed by a helical spring 47 having one end connected to member 39 and the other end thereof connected to spindle 48 upon which disk 45 is mounted. Since the currents induced in disk 45 by magnet 44 will be proportional to the speed of rotation of the magnet, the force exerted to drive the disk 45 around with the magnet will also be proportional thereto and consequently the angular movement of disk 45 against the effort of spring 47 will be a function of the rotational speed of magnet 44 and consequently the greater the rate of such speed of rotation, the greater the displacement of disk 45 from its position of rest. Upon the upper surface of disk 45 is a scale of ground speeds that is visible through apertures 49 and 50 in the members 39 and 38, respectively. The mechanism is protected from the weather and dirt by a glass cover 56.

The mode of operation is as follows: The device is rotated in ring 5 until the axis of shaft 14 is parallel with the relative movement of objects upon the ground and the drift, if any, is read from the scale 51 or 52 on ring 5 opposite lubber lines 55 on member 9, depending upon whether the drift is right or left. Screw 18 is adjusted so that shaft 14 and thread 19 will be given such rotational speed that when an object in the image on the ground as seen on screen 20 is once brought into coincidence with the space between two adjacent turns of thread 19, such object will move across the screen at the same rate as the apparent movement of the space between the threads. This makes the indication of the instrument proportional to the ground speed. Ring 36 is rotated to bring the altitude at which the craft is flying opposite index 41 which rotation, through gear 31, shaft 33, worm 32 and the mechanism connecting the worm 32 to disk 23, changes the position of disk 23 with respect to the center of disk 42 and therefore the speed at which the disk 42 is driven is made a function of the altitude. It is obvious that when the friction disk 23 is moved nearer the center of disk 42, the latter will be driven more rapidly for a given speed of rotation of shaft 14, and vice versa; hence any change in the setting of ring 36 corresponding to a difference in altitude will introduce into the rate at which magnet 44 is driven a corresponding change and thus the speed read from disk 45 is a function of both the ground speed and the altitude of the craft.

The invention described herein may be manufactured and used by or for the Government of the United States for governmental purposes, without the payment of any royalties thereon.

We claim:

1. A device of the class described comprising, in combination, driving means adjustable as to speed and actuatable by the stream of air past an aircraft in flight, means affording a uniformly linearly moving sighting point driven by the said means, a rotatably mounted disk, a magnet carried by said disk, a rotatable speed-indicating dial mounted to be inductively driven by said magnet, means to apply to said dial a reverse torque proportional to the angular displacement of said dial, means forming a driving connection between said second mentioned means and said disk, means to position said driving connection at a distance from the center of said disk that is inversely proportional to the altitude of the craft, a translucent member through which said sighting point is visible, and means to project upon said member an image of the ground beneath the craft.

2. A device of the class described comprising, in combination, driving means adjustable as to speed and actuatable by the stream of air past an aircraft in flight, a rotatable shaft driven by said driving means, a helical thread on at least a portion of said shaft, a rotatably mounted disk, a magnet rotatable with said disk, a rotatable speed-indicating dial mounted to be inductively driven by said magnet, resilient means to restrain the rotation of said dial by said magnet, a friction disk feathered on said shaft and having its periphery bearing on the aforesaid disk, a rotatable altitude scale settable at the altitude of the craft, means connecting said altitude scale and said friction disk to set said friction disk radially of said first disk at distances from the center of said first mentioned disk that are inversely proportional to the altitude setting, a light-permeable member through which said helical thread is visible, and means to project upon said member an image of the ground beneath said craft.

3. A device of the type described comprising, in combination, an air-driven rotor, means to direct upon said rotor a current of air taken from the air stream passing the craft upon which the device is mounted, means to vary the said current and thereby control the speed of said rotor, a shaft driven by said rotor, means on said shaft providing a linearly moving sighting point as the shaft rotates, magnetic speed-indicating mechanism, means forming a driving connection between said shaft and said mechanism including variable speed means, means to vary the effect of said driving means upon said mechanism to introduce into the indication of said mechanism the factor of the altitude of said craft, and means to project an image of the ground beneath said craft to be viewable in conjunction with said sighting point.

4. A device of the class described, comprising a rotatable member providing a linearly moving sighting point, a linearly shiftable disk rotatably driven by said member, a speed indicator of the magnetic inductive type including a disk having frictional driving contact with the said shiftable disk, a travelling nut connected to said shiftable disk to shift the same, a rotatable screw engaged with said nut and fixed against longitudinal movement, a skew gear fixed on said screw, a like gear engaged therewith, a shaft on which said like gear is mounted, a bevel pinion on the last mentioned shaft, a bevel gear meshed with said pinion, a worm gear connected to said bevel gear, a worm meshed with said worm gear, a gear fixed to the shaft of said worm, and a rotatable altitude indicating device having gear teeth meshed with the gear fixed to the worm shaft, whereby setting of said altitude indicating device sets said shiftable disk to a radial position on the disk cooperating therewith to drive said cooperating disk at a rate that is a function of the altitude.

5. A device of the class described, comprising a rotatable member providing a linearly moving sighting point, a speed indicator, variable speed driving means to drive said indicator from said member, and means to vary the speed of said driving means including a traveling nut operatively connected to said driving means, a rotatable screw fixed against longitudinal movement and engaged with said nut to shift the same, a skew gear fixed to said screw, a shaft adjacent thereto, a second skew gear on said shaft meshed with the first mentioned gear, a bevel pinion on said shaft, a bevel gear meshed with said pinion, a worm gear connected to said bevel gear, a worm meshed with said worm gear, a gear fixed on the shaft of said worm, and a rotatable altitude indicating device having teeth meshed with the gear on said worm shaft whereby the speed of said driving means is made a function of the altitude shown by said altitude indicating device.

PHILIP V. H. WEEMS.
ROBERT HENRICH.